(12) United States Patent
Labiste

(10) Patent No.: US 8,917,088 B2
(45) Date of Patent: Dec. 23, 2014

(54) METHOD AND DEVICE FOR DIAGNOSIS OF SENSOR FAULTS FOR DETERMINATION OF ANGULAR POSITION OF POLYPHASE ROTARY ELECTRICAL MACHINE

(75) Inventor: Laurent Labiste, Saint Maur des Fosses (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 641 days.

(21) Appl. No.: 13/260,858

(22) PCT Filed: Mar. 8, 2010

(86) PCT No.: PCT/FR2010/050392
§ 371 (c)(1),
(2), (4) Date: Dec. 30, 2011

(87) PCT Pub. No.: WO2010/112720
PCT Pub. Date: Oct. 7, 2010

(65) Prior Publication Data
US 2012/0092001 A1    Apr. 19, 2012

(30) Foreign Application Priority Data
Mar. 31, 2009  (FR) ...................................... 09 52021

(51) Int. Cl.
*G01B 7/30*     (2006.01)
*G01D 3/08*     (2006.01)

(52) U.S. Cl.
CPC ...................................... *G01D 3/08* (2013.01)
USPC ................... 324/207.2; 324/207.25

(58) Field of Classification Search
CPC ....... H02P 29/021; H02P 6/16; H02P 7/2913; G01R 31/34; B62D 5/0487; B62D 15/0245; F02D 2041/285; F02D 2250/16; H02K 16/02; H02K 21/12; H02K 11/0015; H02K 11/0021; G01P 3/44; F02P 7/07
See application file for complete search history.

(56) References Cited

U.S. PATENT DOCUMENTS

| 5,182,500 A |   | 1/1993 | Shimada |
| 5,291,115 A | * | 3/1994 | Ehsani ........................ 318/701 |
| 8,078,425 B2 | * | 12/2011 | Bernard et al. ............... 702/151 |
| 2008/0012522 A1 | * | 1/2008 | Wiegers et al. ............... 318/638 |

FOREIGN PATENT DOCUMENTS

| EP | 2 124 327 | 11/2009 |
| WO | WO 2006/010864 | 2/2006 |

* cited by examiner

*Primary Examiner* — Minh N Tang
(74) *Attorney, Agent, or Firm* — Berenato & White, LLC

(57) ABSTRACT

Disclosed is a method and device for diagnosis of functioning faults caused by the angular position measurement sensors of the rotor of a polyphase rotary electrical machine comprising a stator, in particular of the alternator-starter type. The diagnosis is obtained by carrying out direct measurements of pairs of sine and cosine signals determined on the basis of linear combinations of the polyphase signals provided by these sensors. This measurement therefore does not make it necessary to know the exact value of the speed of the machine. The diagnosis of functioning faults caused by the angular position measurement sensors requires only the execution of elementary logic operations, i.e. the determination of the "true" or "false" logic states of two inequality equations.

13 Claims, 3 Drawing Sheets

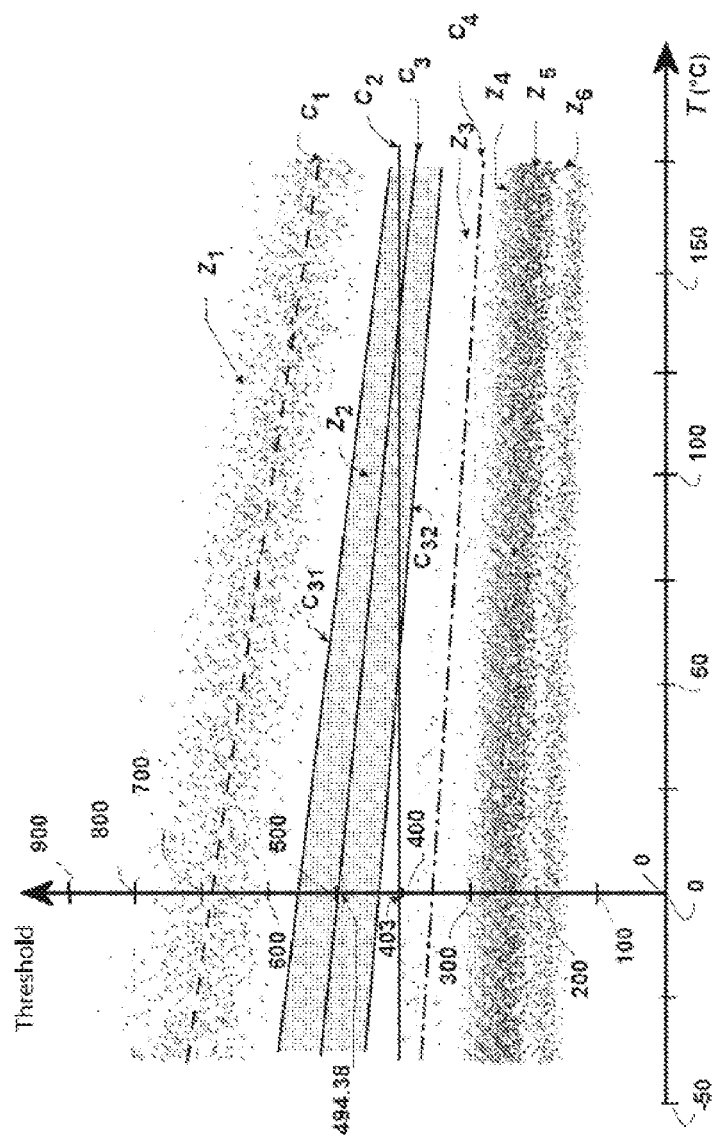

METHOD AND DEVICE FOR DIAGNOSIS OF SENSOR FAULTS FOR DETERMINATION OF ANGULAR POSITION OF POLYPHASE ROTARY ELECTRICAL MACHINE

CROSS-REFERENCE TO RELATED APPLICATIONS AND CLAIM TO PRIORITY

This application relates to International Application No. PCT/FR2010/050392 filed Mar. 8, 2010 and French Patent Application No. 09/52021 filed Mar. 31, 2009, of which the disclosures are incorporated herein by reference and to which priority is claimed.

FIELD OF THE INVENTION

The invention relates to a method for diagnosis of functioning faults of sensors for determination of the angular position of a polyphase rotary electrical machine comprising a stator.

The invention also relates to a device for implementation of a method of this type.

BACKGROUD OF THE INVENTION

It applies more particularly to reversible machines, known as alternator-starters which are used in the automobile industry, in both alternator and engine mode.

Within the context of the invention, the term "polyphase" relates more particularly to three-phase or hexaphase rotary electrical machines, but it can also relate to two-phase rotary electrical machines or machines which function with a larger number of phases.

For the sake of clarity, hereinafter the case of the preferred application of the invention will apply, i.e. the case of a three-phase reversible rotary electrical machine of the alternator-starter type, without this limiting in any way the scope of the invention.

As is well known, a reversible rotary electrical machine comprises an alternator comprising:

a rotor which constitutes an inductor, which is conventionally associated with two collector rings and two brushes by means of which an excitation current is supplied; and
a polyphase stator which bears a plurality of coils or windings, of which there are three in the embodiment considered, which constitute an armature and are connected in the form of a star or most often a triangle in the case of a three-phase structure, and, in alternator functioning, provide converted electric power to a rectifier bridge.

The alternator can also be reversible and constitute an electric motor or rotary electrical machine, which makes it possible to rotate the thermal engine of the vehicle via the rotor shaft. This reversible alternator is known as an alternator-starter. It makes it possible to transform the mechanical energy into electrical energy, and vice versa.

Thus, in alternator mode, the alternator-starter in particular charges the battery of the vehicle, whereas in starter mode the alternator-starter drives the thermal engine, which is also known as the internal combustion engine of the motor vehicle, in order to start the latter.

In the reversible machines in the automobile industry, for example, which function according to the engine or starter modes, the current of the stator must be controlled so as to provide the rotor at all times with the torque which is necessary both to start it up and impart to it the rotation required for the functioning of the engine. The torque to be applied to the rotor, and therefore the current to be supplied to the phases of the stator, is a sinusoidal function of the angular position, indicated by an angle $\theta$, of the rotor relative to the stator.

A complete system for determination of the instantaneous angular position $\theta(t)$ of the rotor of a three-phase alternator-starter and for control of this unit, both in alternator mode and in engine (starter) mode typically comprises four main sub-systems, i.e. an alternator-starter, a reversible alternating-direct electric current converter, a module for control of this converter, and a module for determination of the angular position $\theta$ of the rotor.

The converter is generally constituted by an electronic rectifier bridge comprising as many MOSFET power transistor branches are there are phases, for example three in the example described.

In alternator mode, the alternator-starter supplies the converter with three-phase alternating current, and in engine mode it is the alternator-starter which is supplied with three-phase electrical energy by the reversible converter, which functions in three-phase current generator mode.

In engine mode, the MOSFET transistors are controlled according to an appropriate sequence of six control signals which are generated by the control module. As is also well-known, these signals must be generated according to the angular position $\theta$ of the rotor.

It is therefore necessary to determine this angular position $\theta$ with great accuracy in order to obtain correct functioning of the rectifier bridges, in particular in order to prevent any risk of deterioration of the semi-conductor components, but also and above all, in engine or starter mode, to obtain optimised torque provided by the alternator-starter.

This is the function which is allocated to the module for determination of the angular position of the rotor, so as to generate a signal $\theta(t)$ which represents the instantaneous variation of the angular position measured, and to transmit the signal to the input of the control module.

In the prior art, various methods have been proposed for this purpose.

By way of non-limiting example, in international patent application WO 2006/010864 A2, the applicant proposed a device for determination of the position of a rotor of a rotary electrical machine comprising a stator, which makes it possible to obtain the precise angular position required, whilst being cheap, simple to implement, and insensitive to magnetic disturbances.

The device which is taught in this patent application comprises a plurality of magnetic field measurement sensors which are fixed relative to the stator of the rotary electrical machine, and can supply first signals which are representative of a rotary magnetic machine detected by these sensors, and means for processing of these first signals by an operator, which means can supply second signals dependent on the angular position reached by the rotor.

The sensors are generally constituted by linear Hall-effect sensors, for example three of them, which will be known hereinafter as $S_1$ to $S_3$, placed at 120° electrical degrees on a three-phase rotary electrical machine, in this case an alternator-starter, opposite a target which is integral with the rotor, and is magnetised alternately North/South for each pole of the machine. These sensors $S_1$ to $S_3$ supply signals of sinusoidal types $VS_1$ to $VS_3$ respectively. For a more detailed description, reference can advantageously be made to the description of the aforementioned international patent application WO 2006/010864 A2.

It has been found experimentally that the signals $VS_1$ to $VS_3$ generated by the three measurement sensors $S_1$ to $S_3$, which will be classified as "raw", generally comprise a high level of harmonics, and in particular a substantial level of harmonics of the orders 3 and 5, and that their relative amplitudes are different. On the basis of these three very imperfect raw signals it is therefore difficult to construct two signals which approximate an ideal sinusoidal function (i.e. free from harmonics), have identical amplitudes and zero offsets, and are dephased in a non-trivial manner (dephasing which is not a multiple of 180°).

In order to eliminate this difficulty, the basic principle is to obtain two distinct linear combinations which make it possible to obtain the two sinusoids required, whilst avoiding as far as possible the above-described problems.

In the first approximation, it is possible to allow the sensors to have characteristics which are identical or at least very similar, and to be placed in the same thermal and electromagnetic environment, and therefore the signals which are emitted by the sensors retain common characteristics. These hypotheses give reason to consider that:

their offsets develop at the same time, depending on any disturbance field (such as, for example, the magnetisation of the rotor);

their harmonic levels of the order 3 are very similar, and in phase with their fundamental harmonics; and the electric signals generated by these sensors are dephased by approximately 120°.

These hypotheses make possible the choice of two linear combinations which partly cancel out the harmonic of the order 3 and the offsets. In a simple manner, by selecting for linear combinations the differences between sensor output signals, two sinusoidal signals are obtained which are dephased by 60°, and correspond to the above-described criteria of choice. The signals thus obtained are re-centred and contain fewer harmonics than the raw signals.

Once the two sinusoids have been obtained, it becomes possible to extract directly the value θ of the angular position of the rotor. For this purpose, by dividing the two aforementioned signals, the amplitude is dispensed with, then, by means of a mathematical function or a table it is possible to invert the function and determine the angular quadrant by means of the signs of the signals. For the sake of clarity, by way of non-limiting example, if the dephasing between signals is $\phi=90°$ for example (sine-cosine signals), this is an Arc Tangent function. Once again, for a more detailed description of the method, reference can advantageously be made to the aforementioned international patent application WO 2006/010864 A2.

In practice, these functioning conditions, which can be classified as "ideal" are rarely fulfilled.

Consequently, again in practice, the above-described method often proves to be unsatisfactory.

Consequently, in its French patent application no. 0853359 filed on 23 May 2008, the applicant proposed a method and a device for determination of the angular position which eliminate the disadvantages of the prior art.

For this purpose, according to an essential characteristic of this method, the real angular position of the rotor of the rotary electrical machine is determined by using a system for control between a real angular position and an estimated angular position. The device which is taught by this patent application comprises a feedback loop which will be known hereinafter as a tracking loop, the behaviour of which is similar to that of a phase lock loop or PLL.

The circuits which constitute the device for determination of the angular position of the stator are designed such that the following equation (1) is fulfilled:

$$\sin(\theta_{real}+\phi_1)\cdot\sin(\theta_{est}+\phi_2)\cdot\sin(\theta_{real}+\phi_2)\cdot\sin(\theta_{real}+\phi_1)=\tfrac{1}{2}(\phi_2-\phi_1)\cdot\sin(\theta_{real}-\theta_{est})$$

In this equation:

$\theta_{real}$ represents the real angular position of the rotor;

$\theta_{est}$ represents the estimated angular position of the rotor; and $\phi_1$ and $\phi_2$ represent the dephasings of the signals corresponding to angular offsettings of the sensors relative to an angular reference point which is associated with the stator of the rotary electrical machine.

Consequently, $\phi=(\phi_1$ and $\phi_2)$ is a constant (these two dephasings being determined by a single angular reference point), and represents the dephasing between the signals $\theta_{real}$ and $\theta_{est}$.

This equation makes it possible to obtain a signal for error between the real angular position and the estimated angular position.

The so-called tracking loop makes it possible to minimise the error between $\theta_{real}$ and $\theta_{est}$. If this error becomes slight, it is well known that $\sin(\theta_{real}-\theta_1)$ is substantially equal to $(\theta_{real}-\theta_{est})$. The second term of the aforementioned equation then becomes substantially equal to $K(\phi_1-\phi_2)$, where K is a constant equal to $\tfrac{1}{2}\sin(\phi)$.

Hereinafter, for the sake of clarity, the context of a device of this type will apply, without this limiting in any way the scope of the invention.

It can easily been understood that the determination of the angular position θ of the rotor relative to the stator depends on the reliability of the information provided by the measurement sensors, irrespective of the exact method implemented since, in all cases, this angular position is obtained from a combination of the polyphase signals provided by these sensors.

It is therefore necessary to ensure that the sensors are functioning satisfactorily, and to implement a method for diagnosis of functioning faults of these sensors.

Within the context of the invention it must be understood that "measurement sensor faults" also means faults of the peripheral electrical and electronic circuits (electrical connections, circuits for the electrical energy supply to the sensors, etc.).

In the prior art, different diagnostic methods have been proposed.

The diagnosis of the angular position measurement sensors can be obtained by a comparison between an evaluation of the speed of the vehicle carried out by the aforementioned tracking loop, and measurement of this speed carried out by a calculation unit for example. However, the tracking loop which permits estimation of the electrical position can return an accurate mean speed value even when one or a plurality of sensors has faults (such as an open circuit or a short-circuit).

FIG. 1 which is placed at the end of the present description illustrates an example of development of the speed of rotation of the rotor V, according to the time t. In this FIG. 1, a plurality of successive sensor faults have been simulated (open circuits, short-circuits, etc.), as shown by the development of the instantaneous speed $V_{inst}$. It is found nevertheless that the tracking loop remains locked and provides a mean speed $V_{moy}$ which is altogether correct.

Consequently, an external speed measurement is necessary in order to obtain a reference value.

Another method consists of using only the error signal of the tracking loop. However this loop is very sensitive to small saturations, and cannot detect any error in the presence of signals with a very low amplitude (including the errors caused by short-circuits of the sensor or connectors which are disconnected). In addition, in certain-practical embodiments, the tracking loop error signal is contaminated by substantial noise as the result of lack of calibration and low accuracy caused by the simplification of the electronic circuits used. A significant margin must therefore be allowed as far as the detection thresholds are concerned. Consequently, a certain number of faults cannot be diagnosed. For example, simultaneous disconnection of the three angular positioning measurement sensors or disconnection of the electrical energy supply source is not detected.

Another method consists of obtaining the sum of the signals generated at the output from the three measurement sensors $S_1$ to $S_3$, i.e.:

$$\Sigma = VS_1 + VS_2 + VS_3 \approx 0$$

However, this method makes it necessary to resort to additional electronic circuits such as, either to measure the signal $VS_1$ or to measure the complete sum of signals, which increases the complexity of the diagnostic device, and makes it more costly. In addition, for the reason previously given (low accuracy due to the lack of calibration), it is necessary to accept a substantial margin as far as the detection thresholds are concerned. Consequently, a certain number of faults cannot be diagnosed. For example, as previously stated, the disconnection of the three sensors or of the electrical energy supply source is not detected.

SUMMARY OF THE INVENTION

The object of the invention is a method for diagnosis of functioning faults caused by the angular position measurement sensors of the rotor of a polyphase rotary electrical machine comprising a stator, in particular of the alternator-starter type, which eliminates the disadvantages of the prior art, some of which have been indicated, without a significant increase in either the complexity of the electronic circuits implemented, or the overall cost.

According to a main characteristic of the method according to the invention, the diagnosis of the angular position measurement sensors for the rotor is obtained by carrying out direct measurements of pairs of sine and cosine signals determined on the basis of linear combinations of the polyphase signals provided by these sensors, the acquisition of a parameter which will be known as the "speed state", in this case typically the states "speed>0" and "speed=0" (or also "speed≥0"), and a minimum speed profile.

This measurement therefore does not make it necessary to know the exact value of the speed.

According to the method of the invention, diagnosis of the main errors caused by the angular position measurement sensors is obtained simply by determining the "TRUE" or "FALSE" logic states of the two equations indicated hereinafter:

when $E_{vt} > 0 t/mn:[(S_{pp} < TRIG\_PP) \text{ OR } (C_{pp} < TRIG\_PP)]$;  (A)

when $E_{vt} \geq 0 t/mn:[(V_{ref} - \Delta < S < V_{ref} + \Delta) \text{ AND } [(V_{ref} - \Delta < C < V_{ref} + \Delta)]$  (B)

where:
  $E_{vt}$ is the speed state reached by the rotor of the alternator-starter expressed in rpm (t/rtm)
  "OR" and "AND" are respectively the non-exclusive disjunction and conjunction logic operators;
  S is the instantaneous value of the sine signal;
  C is the instantaneous value of the cosine signal;
  $S_{pp}$ is the maximum peak-to-peak amplitude of the sine signal;
  $C_{pp}$ is the maximum peak-to-peak amplitude of the cosine signal;
  $V_{ref}$ is an offset value for an analogue-digital conversion alignment implemented in the feedback chain; and
  TRIG_PP and $\Delta$ are two threshold values.

If the equations (A) and/or (B) are confirmed, i.e. in the "TRUE" logic state, this state is characteristic of at least one faulty state of the angular position measurement sensors, or at least of the peripheral electric/electronic circuits of these sensors (electrical connections, electrical energy supply, etc.) and of the magnetic target itself.

The threshold value TRIG_PP is obtained by means of the so-called "Monte-Carlo" statistical method. For this purpose, in a preliminary phase of the method, a global mathematical model of the "alternator-starter/tracking loop" system is created, and random modifications are applied to this model. Mathematical processing makes it possible to calculate the aforementioned threshold value TRIG_PP on the basis of this distribution of states.

These different parameters are described and specified in greater detail hereinafter.

The invention therefore has many advantages, including the following:

The diagnosis of functioning faults caused by the angular position measurement sensors requires only the execution of elementary logic operations, i.e. the determination of the "true" or "false" logic states of two inequations.

The parameters contained in the inequations are substantially already acquired for the needs specific to the tracking loop. In particular, the two sign and cosine signals are necessary in order to determine the value $\theta$ of the angular position of the rotor. The determination of the aforementioned logic states can be obtained simply, in a preferred embodiment, by making use of one of the on-board computers present in any vehicle with a modern design.

The calculation of the values of the aforementioned threshold values TRIG_PP, $\Delta$ and $V_{ref}$ is carried out during a single preliminary phase, typically during the design of the system, and does not require any additional circuit on board the vehicle, or even modifications of software systems implemented in the programme memories of the on-board digital computers.

The main object of the invention is thus a method for diagnosis of functioning faults which exist in sensors implemented in a system for measurement of the angular position of a rotor of a polyphase rotary electrical machine comprising a stator, the sensors being fixed relative to the stator, and able to detect a magnetic field and provide first signals which are representative of this magnetic field, characterised in that it comprises at least one step of generation, from linear combinations of the said first signals, of at least one pair of first and second sinusoidal signals, which are dephased by a predetermined value different from zero and from 180°, representing an angular position of the rotor;

a step of determination of a first parameter known as the speed state $E_{vt}$ of the rotor, which assumes two values $E_{vt} > 0$ or $E_{vt} \geq 0$, a step of calculation of the following first and second equations:

$$[(S_{pp} < TRIG\_PP) \text{ OR } (C_{pp} < TRIG\_PP)];$$

$$[(V_{ref} - \Delta < S < V_{ref} + \Delta) \text{ AND } [(V_{ref} - \Delta < C < V_{ref} + \Delta)],$$

in which "OR" is the non-exclusive disjunction logic operator and "AND" is the conjunction logic operator, $S_{pp}$ is the maximum peak-to-peak amplitude and S is the instantaneous value of the said first sinusoidal signal, $C_{pp}$ is the maximum peak-to-peak amplitude and C is the instantaneous value of the said second sinusoidal signal, and TRIG_PP, $V_{ref}$ and $\Delta$ are three predetermined threshold values;

a step, when the said speed parameter $E_{vr}$ is greater than zero, of determination of the logic state "TRUE" or "FALSE" of the said first equation, of generation of a signal which indicates fault-free functioning of the said sensors when this first equation is not confirmed, and a functioning fault of at least one of these sensors when it is confirmed;

and a step, when the said speed state parameter $E_{vt}$ is equal to, or greater than zero, of determination of the logic state "TRUE" or "FALSE" of the said second equation, of generation of a signal which indicates fault-free functioning of the said sensors when this second equation is not confirmed, and a functioning fault of at least one of these sensors when it is confirmed.

The object of the invention is also a device for implementation of this method.

The invention will now be described in greater detail with reference to the attached drawings, in which:

BRIEF DESCRIPTION OF THE DRAWINGS

FIG. 4 is a diagram illustrating distribution of threshold values obtained by means of the Monte-Carlo method according to the temperature, such as to determine threshold ranges in order to obtain an error diagnosis when the speed of rotation of the rotor is not zero.

DETAILED DESCRIPTION

Hereinafter, without in any way limiting the scope of the invention, unless otherwise stated, the context of its preferred embodiment will apply, i.e. the case of a system for determination of the angular position of a rotor of an alternator-starter which implements a system for control between a measured angular position and an estimated angular position.

Figure 2:
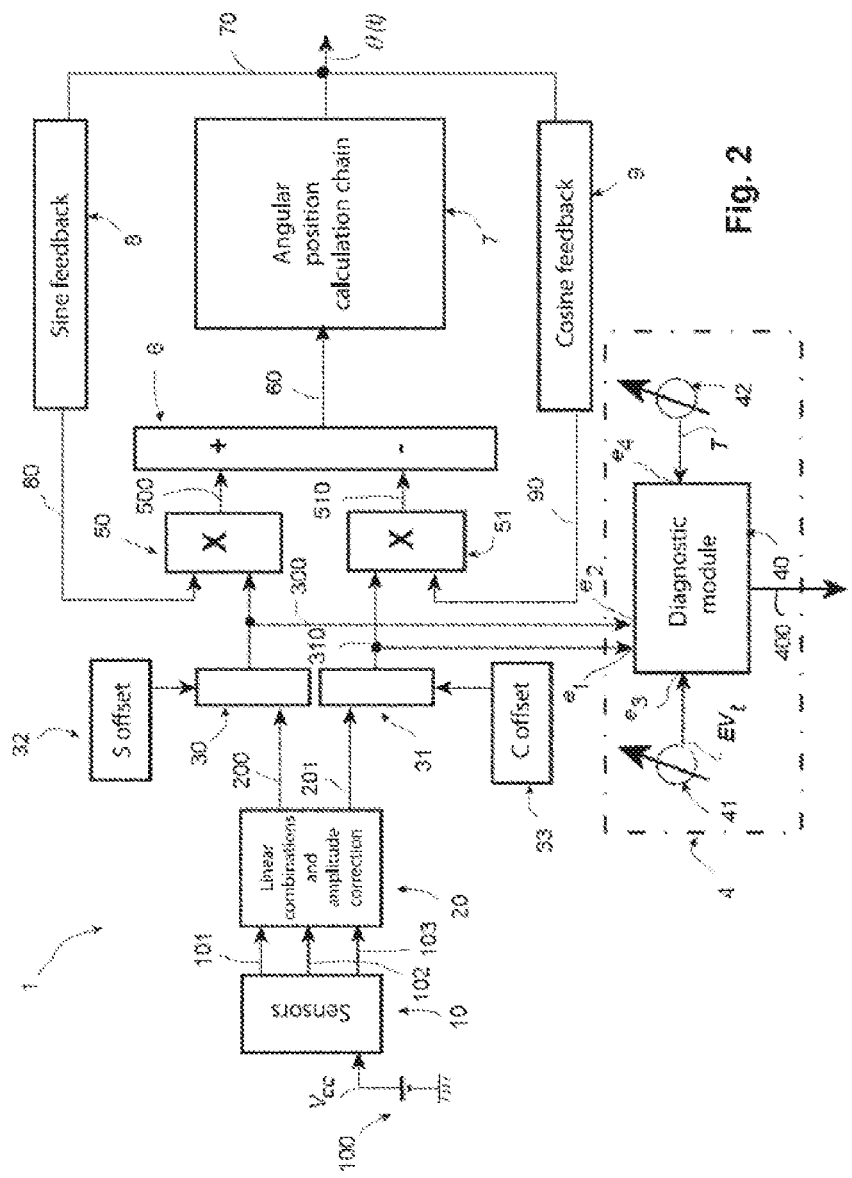
FIG. 2 illustrates schematically an embodiment of a system for determination of the angular position of a rotor of an alternator-starter which incorporates a device for diagnosis of the functioning faults of the angular position measurement sensors according to a preferred embodiment of the invention.

FIG. 2 illustrates an example of a system 1 for determination of the angular position of a rotor of an alternator-starter according to the architecture described in the aforementioned French patent application no. 0853359. It also incorporates a device 4 for diagnosis of the functioning faults of the angular position measurement sensors according to a preferred embodiment of the invention.

The alternator-starter (not illustrated in this figure) can be of a type which is altogether similar to the prior art, or identical. The sensors in the block 10 are constituted for example by three Hall-effect sensors disposed at electrical 120° for a three-phase rotary machine. The electrical energy supply of these sensors 10 is symbolised by a battery 100 which provides a voltage $V_{cc}$ of, for example, +5V.

The sensors 10 provide to the output connections 101 to 103 three "raw" signals which will be known as $VS_1$ to $VS_3$, and are transmitted to a module 20 of linear combinations and amplitude correction which generates at its outputs, connections 200 and 201, two signals which are transmitted to supplementary modules 30 and 31.

The modules 30 and 31 apply to these signals offset values which are provided by the modules 32 and 33 respectively. The modules 32 and 33 can be constituted by memory circuits which contain predetermined offset values.

At the outputs 300 and 310 from the modules 30 and 31, there are therefore two sinusoidal signals with the same amplitude which are centred on an axis (in other words without offset), and are dephased by a non-trivial predetermined value $\phi$, i.e. which is different from 0° or from 180°, and is advantageously 90°, which signals will be known hereinafter as $S_{sin}$ and $C_{cos}$.

These two components, which are derived from signals measured by the sensors 10, and are formed so as to approximate sinusoidal functions as closely as possible, are each transmitted to first inputs of multipliers 50 and 51 respectively, via the connections 300 and 310. They therefore represent two instances of the instantaneous value of the measured angular position of the rotor. These multipliers 50 and 51 receive at second inputs two components derived from the instantaneous value of an estimated angular position $\theta(t)$ via two feedback branches 8 and 9 (connections 80 and 90), which will be known as the "sine feedback" and "cosine feedback" respectively. The signals output from the multipliers 50 and 51 are transmitted by the connections 500 and 510 to the inputs of a subtractor 6, the output signals of which (connection 60) are transmitted to an angular position calculation chain 7. The signals which are output to the connection 70 represent the instantaneous value of the estimated angular position $\theta(t)$ and are re-injected to the second inputs of the multipliers 50 and 51 via the aforementioned feedback circuits 8 and 9.

The circuits which constitute this architecture provided with a tracking loop are arranged such that the equation (1) referred to in the preamble of the present description is fulfilled.

Up to this point, the architecture of the above-described system 1 for determination of the angular position of a rotor of an alternator-starter is common to an embodiment according to the prior art.

A description will now be given of a preferred embodiment of a device 4 for diagnosis of functioning faults of sensors 10 for determination of the angular position of the rotor which is incorporated in this system 1, and more generally in many other systems which use sensors for determination of the angular position of a rotor of a polyphase machine. As will be demonstrated, it is simply necessary to have at least one pair of signals obtained from linear combinations of the polyphase signals generated by the sensors, which in itself is known, and is not specific to the invention.

The device 4 which is specific to the invention, for diagnosis of functioning faults of the sensors 10 for determination of the angular position of the rotor, comprises a diagnostic module 40 itself, and means 41 to indicate the speed of the rotor, and more specifically a speed state $EV_r$.

In fact, as previously stated, according to an advantageous characteristic of the method of the invention, it is not necessary to know the precise value of the speed, but only to distinguish between the distinct states.

The diagnostic module 40 receives at first and second inputs $e_1$ and $e_2$ the signals which are present at the outputs 300 and 301, which are known as $S_{sin}$ and $C_{cos}$. The signal which represents the speed state $E_{vt}$ is transmitted to a third input $e_3$ of the module 40.

The module 40 generates as output a signal 400 which indicates the presence or absence of sensor functioning faults, the nature of which will be specified hereinafter.

These three series of signals constitute the essential information which it is necessary to know at cruising speed in order to obtain a diagnosis of the main functioning faults of the sensors for determination of the angular position of a rotor.

As previously stated, this diagnosis is obtained by determining the "TRUE" or "FALSE" logic states of the equations (A) and (B) below:

when $E_{vt}>0 t/mn$:[$(S_{pp}<TRIG\_PP)$ OR $(C_{pp}<TRIG\_PP)$]; (A)

when $E_{vt} \geq 0 t/mn$:[$(V_{ref}-\Delta<S<V_{ref}+\Delta)$ AND [$(V_{ref}-\Delta<C<V_{ref}+\Delta)$]] (B)

The different parameters which are given in these equations have been specified in the preamble of the present description, and do not need to be explained again.

A logic state of the equations (A) and/or (B) in the "TRUE" state indicates at least one faulty state of the Hall-effect sensors 10 or of the peripheral electrical/electronic circuits (electrical connections, electrical supply circuits 100, etc.).

When the equation (A) is confirmed, in other words when $E_{vt} \neq 0$ t/mn, the main faulty states diagnosed obtained are as follows (for a rotation speed range $E_{vt}$ going from a very small number of revolutions per minute to a high number of revolutions per minute, a single period of rotation being sufficient to carry out the diagnosis):

- $S_1$ short-circuited, i.e. for example connected to a potential at 0V or 5V, on the assumption that these sensors are supplied by the electrical supply source 100: $V_{cc}=+5V$;
- $S_1$ disconnected;
- $S_2$ or $S_3$ short-circuited, for example at 0V, +5V or between one another;
- $S_2$ or $S_3$ disconnected;
- $S_1$ and $S_2$ short-circuited, for example at 0V, +5V or between one another;
- $S_1$ and ($S_2$ or $S_3$) disconnected;
- $S_1$ and $S_2$ and $S_3$ short-circuited, for example at 0V, +5V or between one another;
- $S_1$ and $S_2$ and $S_3$ disconnected;
- electrical energy supply source 100 faulty, which in particular includes disconnection of the source, short-circuiting to ground (earth of the device) or short-circuiting at the voltage $V_{cc}$ (+5V in the example described);
- detection of short-circuit impedance, typically lower than 5 K$\Omega$, obviously depending on different parameters associated with a mode of practical embodiments of the device.

When the equation (B) is confirmed, including at zero speed, the main faulty states diagnosed obtained are as follows:

- $S_1$ and $S_2$ and $S_3$ disconnected;
- $S_1$ and $S_2$ and $S_3$ short-circuited, for example at 0V, +5V;
- $S_1$ and $S_2$ and $S_3$ short-circuited, for example at 0V, +5V or between one another;
- electrical energy supply source 100 faulty.

Another piece of information which needs to be known is the minimum period of time which must elapse after starting, before a significant peak-to-peak measurement can be made of the signals $S_{sin}$ and $C_{cos}$. This information depends on the speed profile which the system has.

For the sake of clarity, it will be assumed that:

$$S_{sin} = V\sin(\theta + \frac{\pi}{6}) \text{ and } S_{cos} = V\sin(\theta - \frac{\pi}{6}),$$

such as to obtain a complete period for the two signals $S_{sin}$ and $C_{cos}$, where $$\theta_{min} = \pi + \frac{\pi}{6}.$$

Again for the sake of clarity, it is assumed that a minimum speed gradient makes it possible to go from a speed of rotation of the rotor from 0 to 300 rpm in 0.6 seconds. In these conditions, the calculation shows that a cruising speed of 500 rpm is reached in approximately 180 ms.

Figure 1:
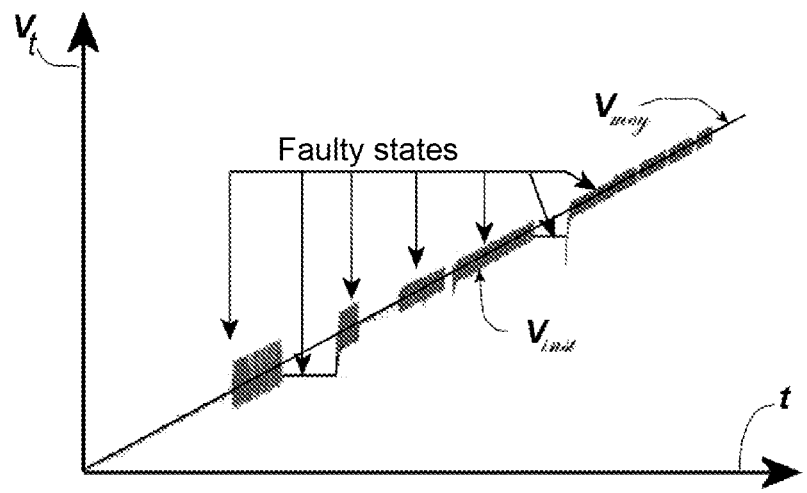
FIG. 1 is a diagram which illustrates schematically an example of a curve showing the development of the speed of rotation of the rotor of a polyphase rotary electrical machine on a time basis, and simulating various faults of the angular position measurement sensors of this rotor.
Figure 3:
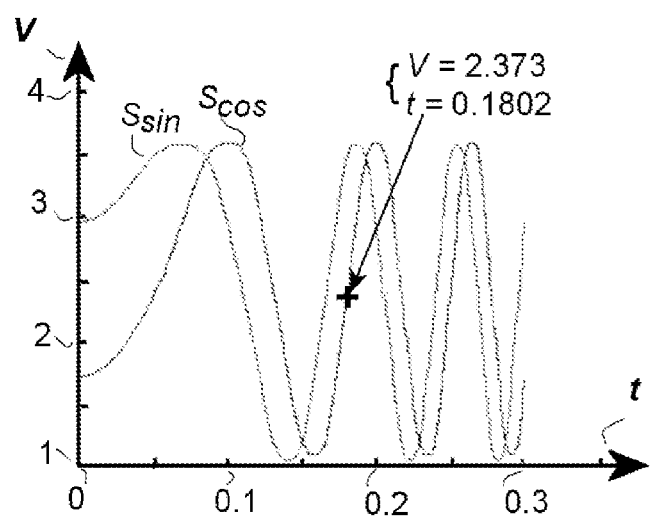
FIG. 3 is a diagram showing the development on a time basis of a pair of signals obtained by linear combinations of the signals generated by the angular position measurement sensors of the system in FIG. 1.

FIG. 3 is a diagram showing the development of the signals $S_{sin}$ and $C_{cos}$ on a time basis. The Y-axis (voltages V) is graduated in volts, and the X-axis (time t) is graduated in seconds. In the example described, after a transitory period, a cruising speed of t=0.1802 seconds is reached.

Consequently, in the case of $E_{vt}>0$ (equation (A)), a significant diagnosis can be obtained after a minimum period of time of approximately 180 ms.

A priori, this parameter is known once and for all for an alternator-starter with given physical and electrical characteristics. It is therefore not necessary to provide particular measurement means on board the vehicle.

The same applies for the threshold value TRIG_PP included in the equation (A), as described in the preamble of the present description.

This parameter is determined during a preliminary phase of the method, a priori once and for all during the design of a system with given physical and electrical characteristics.

For this purpose, in order to obtain the threshold value TRIG_PP, it is possible to use a statistical method, for example advantageously the so-called "Monte-Carlo" algorithm. This algorithm is very general, and can be applied to any model for which it is possible to carry out random modifications of this model, and to associate a so-called energy variable with each of the modifications. The theory shows that once the stationary state has been reached, the distribution of the states corresponds to a Boltzman's distribution.

Within the context of the method according to the invention, during an initial phase, a global mathematical model of the system "magnetic target part of the alternator-starter-tracking loop" is created, and random modifications are applied to this model so as to obtain the aforementioned Boltzman's distribution of states when a stationary state is reached. Mathematical processing makes it possible to calculate the threshold value TRIG_PP from this distribution of states.

Two main cases arise:

- The magnetic target material is insensitive or has low sensitivity to the variations of temperature, at least in the field of normal functioning of the system: it is then possible to adopt a constant value for the threshold value TRIG_PP. This is the case for example with a magnetic target material based on rare earth.
- The magnetic target material is sensitive to the variations of temperature. It is then necessary to take the temperature into account, and the function which describes the threshold is a linear function with the form:

$TRIG\_PP=pT+K_s$ (2)

where p is the proportionality constant (gradient), T in ° C. and $K_s$ is a constant threshold value. This is the case for example with a magnetic target material based on ferrite.

In the first case, in order to determine the instantaneous temperature of the magnetic material, a measurement sensor or temperature estimator 42 is provided, as illustrated schematically in FIG. 2. The output signal of this temperature measurement sensor 42 is transmitted to a fourth input $e_4$ of the diagnostic module 40.

Although this diagnostic module has been represented in the form of autonomous calculation circuits, i.e. with wired logic, which resolve the two inequations (A) and provide a diagnostic signal $V_{diag}$ as output, it must be understood that the calculations which are necessary for development of the diagnosis of satisfactory functioning or malfunctioning can be carried out by other means. Advantageously, it is possible in particular to resort to one of the on-board computers present in any vehicle with a modern design, simply by adapting the programmes (micro-programmes, etc) which are implemented in this computer, and by providing suitable interface circuits. This embodiment does only a few modifications, and is neither complex nor costly. In addition it is highly flexible, since it is well known to persons skilled in the art that the programmes can be updated as required (corrections of bugs, addition of functions, etc.).

FIG. 4 is a diagram illustrating a distribution of threshold values obtained by means of the aforementioned Monte-Carlo method, according to the temperature. The X-axis is graduated in threshold values from 0 to 900, and the Y-axis is graduated in ° C., from −50 to +175° C. in the example described, with 3,000 peak-to-peak measurements having been carried out.

The diagram in FIG. 4 has a plurality of distinct areas, which are characteristic of particular functioning faults of the sensors or of the peripheral circuits of these sensors:

area $Z_1$: the measurement points are distributed around a straight line with a negative gradient $C_1$. In this area $Z_1$, the sensors 10 and/or their peripheral circuits (electrical connections, supply circuit 100, etc.) do not have any fault.

area $Z_3$: the measurement points are distributed around a straight line with a negative gradient $C_4$. In this area the sensor $S_1$ has a fault, and is disconnected (circuit open).

area $Z_4$: in this area the sensor $S_1$ is permanently connected to the potential $V_{cc}$ of the supply source 100 (+5V in the example described).

area $Z_5$: this area represents a plurality of distributions of measurement points which interpenetrate strongly, and characterise various functioning faults of sensors or peripheral circuits of these sensors: sensor $S_1$ or sensor $S_2$ short-circuited to zero potential, sensor $S_2$ permanently connected to the potential $V_{cc}$ of the supply source 100 (+5V in the example described), sensors $S_1$ and $S_2$ disconnected (circuits open), sensors $S_2$ and $S_3$ short-circuited to zero potential, sensors $S_1$ and $S_2$ short-circuited, or sensors $S_1$ and $S_2$ disconnected (circuits open).

area $Z_6$: in this area the sensor $S_2$ is disconnected (circuit open).

It should be noted that the frontiers between areas are not clear. Consequently, clouds of measurement points are common to two adjacent areas, in particular as far as the areas $Z_4$ and $Z_5$ are concerned.

From these various measurements, the following can be deduced:

In the case of a magnetic material which is sensitive to temperature, in order to obtain a maximum margin for the threshold value, this threshold value is made dependent on the temperature. For the sake of clarity, in the case of the example selected, the aforementioned linear function (2) which represents the threshold value can be as follows:

$$TRIG\_PP = -0.6407 \times T + 494.38 \quad (3)$$

This curve is represented on the diagram in FIG. 4 by a straight line $C_3$ with a negative gradient k=−0.6407, which intersects the Y-axis at the threshold value K=494.38.

In the case of a magnetic material which is insensitive or has low sensitivity to the variations of temperature, a constant value is adopted for the threshold value TRIG_PP. For the sake of clarity, in the example described, if it is wished to diagnose 100% of all the sensor faults, it is possible to select the following value: TRIG_PP=449. By way of compromise it is possible to select a slightly lower value, on the understanding that a few cases of disconnection of $S_1$ may not be detected, for example. In this hypothesis, in the example described, it is possible to select following value: TRIG_PP=403. This last case corresponds to the horizontal straight line $C_2$ illustrated in FIG. 4, which intersects the Y-axis at the threshold value TRIG_PP=403.

Table I placed at the end of the description illustrates these two hypotheses and the results obtained concerning the probability of detection of the different sensor faults. This shows that for TRIG_PP=403 less than 1% of the cases of faults caused by the disconnection of $S_1$ is not detected.

FIG. 4 shows an area $Z_2$ which is delimited by two straight lines $C_{31}$ and $C_{32}$ with negative gradients, situated on both sides of the straight line $C_3$ corresponding to the aforementioned function (3). This area $Z_2$ represents an area of safety for threshold margins which assure 100% detection of the faults caused by the sensors. More specifically, the straight line $C_{32}$ assures a minimum threshold according to the temperature T which makes it possible to assure this 100% detection. The straight line $C_{31}$ makes it possible to limit the maximum threshold values to acceptable values, which are as low as possible. It is found that the straight line $C_2$ is outside the safety margin defined by the area $Z_2$ for the low temperatures (range between −50° C. and +50° C. approximately), which explains why certain faults are not detected (less than 1%) as previously stated.

When the rotation speed state is $E_{vr} > 0$, it is necessary to determine whether the equation (B) is confirmed ("TRUE" logic state). The equation (B) is confirmed if the two inequations which constitute it are confirmed simultaneously ("AND" logic function). In this equation, the threshold parameter TRIG_PP no longer plays a part, and it is unnecessary to have temperature information.

On the other hand, it is necessary to know two other threshold values, i.e. $V_{ref}$ and $\Delta$.

The aforementioned threshold values depend in particular on the offset values used (FIG. 2: circuits 332 and 33) in order to generate the signals $S_{sin}$ and $S_{cos}$ (FIG. 2: outputs 300 and 310).

For the sake of clarity, according to an embodiment of the system 1 in FIG. 2, with numerical values on 10 bits, it is possible to adopt the following typical values: $\Delta$=43 and $V_{ref}$=512. When thresholds of this type are adopted, experience shows that 100% of the disconnections of the three sensors $S_1$ to $S_3$ are detected.

According to an additional embodiment which is not specifically illustrated, it is possible to refine further the diagnosis of functioning faults of the angular position measurement sensors for the rotor. This objective can be achieved by increasing the number of pairs of signals derived by means of linear combinations from the signals generated by these sensors.

By reading the preceding description, it can easily be seen that the invention achieves the objectives set: which need not be repeated in full.

In particular, as previously stated, the method according to the invention makes it possible to carry out simply diagnosis of the main functioning faults of the angular position measurement sensors for the rotor, with great reliability, and without needing a significant increase in the complexity of the circuits which are necessary for implementation of this method. In fact, it is integrated perfectly in the architectures of systems for angular position measurements for the rotor according to the prior art, and requires only slight hardware and/or software modifications, which does not lead to a significant additional cost.

However, the invention is not limited simply to the method and device according to the invention explicitly described in relation to FIGS. 2 to 4, or simply to the preferred application relating to determination of the angular position of the rotor of a three-phase alternator starter.

Without departing from the context of the invention, the device applies to any polyphase rotary machine, for example which is two-phase, three-phase, hexaphase, etc., in engine and/or alternator mode, comprising sensors for measurement of the angular position of the rotor relative to the stator, and for which there is at least one pair of signals which are dephased in a non-trivial manner, and are obtained by linear combinations of the polyphase signals generated by these sensors.

TABLE I

| | Constant threshold TRIG_PP | |
|---|---|---|
| Faults | =403 % of non-detection | =409 % of non-detection |
| No fault | 0.0% | 0.0% |
| $S_1 = 0$ | 0.0% | 0.0% |
| $S_1 = 5$ | 0.0% | 0.0% |
| $S_1$ disconnected | 0.97% | 0.0% |
| $S_2 = 0$ | 0.0% | 0.0% |
| $S_2 = 5$ | 0.0% | 0.0% |
| $S_2$ disconnected | 0.0% | 0.0% |
| $S_1$ and $S_2 = 0$ | 0.0% | 0.0% |
| $S_2$ and $S_3 = 0$ | 0.0% | 0.0% |
| $S_1$ and $S_2$ disconnected | 0.0% | 0.0% |
| $S_1$ and $S_2$ short-circuited | 0.0% | 0.0% |

The invention claimed is:

1. A method for diagnosis of functioning faults which exist in sensors implemented in a system for measurement of the angular position of a rotor of a polyphase rotary electrical machine comprising a stator, said sensors being fixed relative to said stator, and able to detect a magnetic field and provide first signals which are representative of said magnetic field, said method comprising the steps of:

generating, from linear combinations of said first signals (101-103), at least one pair of first (200) and second (201) sinusoidal signals, which are dephased by a predetermined value different from zero and from 180°, representing an angular position of said rotor;

determining a first parameter known as a speed state $E_{vt}$ of said rotor, which assumes two values $E_{vt}>0$ or $E_{vt}>0$;

calculating the following first and second equations:

$$[(S_{pp}<TRIG\_PP) \text{ OR } (C_{pp}<TRIG\_PP)];$$

$$[(V_{ref}-\Delta<S<V_{ref}+\Delta) \text{ AND } [(V_{ref}-\Delta<C<V_{ref}+\Delta)],$$

in which "OR" is the non-exclusive disjunction logic operator and "AND" is the conjunction logic operator, $S_{pp}$ is the maximum peak-to-peak amplitude and S is the instantaneous value of said first sinusoidal signal (200), $C_{pp}$ is the maximum peak-to-peak amplitude and C is the instantaneous value of said second sinusoidal signal (201), and TRIG_PP, $V_{ref}$ and $\Delta$ are three predetermined threshold values;

determining, when said speed state parameter $E_{vt}$ is greater than zero, the logic state "TRUE" or "FALSE" of said first equation, and generating a signal (400) which indicates fault-free functioning of said sensors when said first equation is not confirmed, and a functioning fault of at least one of these sensors when said first equation is confirmed; and determining, when said speed state parameter $E_{vt}$ is equal to or greater than zero, the logic state "TRUE" or "FALSE" of said second equation, and generating a signal (400) which indicates fault-free functioning of said sensors when said second equation is not confirmed, and a functioning fault of at least one of said sensors when said second equation is confirmed.

2. The method according to claim 1, comprising a first preliminary phase, which is carried out during the design of said system (1), for measurement of angular position, comprising a step of constructing a mathematical model of said system, a step of application to said model of a plurality of random modifications according to a statistical method known as the Monte-Carlo method, such as to obtain a distribution of states known as Boltzman's distribution, when a stationary state is reached, and of determining said predetermined threshold value TRIG_PP on the basis of said distribution.

3. The method according to claim 1, wherein said system (1) comprises a chain (7) for calculation of said angular position, comprises an analogue-digital converter and circuits (32-33) which apply offset values to said first (200) and second (201) sinusoidal signals, said method comprises a second preliminary phase which is carried out during the design of said system (1) for measurement of the angular position, comprising a step for determination of said predetermined threshold values $V_{ref}$ and $\Delta$, on the basis of said offset values and electrical characteristics of said analogue-digital converter.

4. The method according to claim 1, comprising a further step of acquisition of a speed profile parameter of said system (1) for measurement of the angular position of a rotor, and a step for calculating on the basis of said speed profile, of a minimum period of time in order to carry out significant peak-to-peak measurements of said first and second sinusoidal signals outside a transitory period.

5. Method according to claim 1, wherein, with said polyphase rotary electrical machine comprising a magnetic material which is insensitive to temperature variations in a predetermined functioning range of said system (1) for measurement of the angular position of said rotor, said threshold TRIG_PP is set to a constant minimum value ($C_2$) to delimit two regions, including a first region for values higher than said threshold, which is characteristic of fault-free functioning of said sensors (10), and a second region for values which are lower than said threshold, which is characteristic of functioning faults of said sensors (10).

6. The method according to claim 1, wherein, with said polyphase rotary electrical machine comprising a magnetic material which is sensitive to temperature variations in a predetermined functioning range of said system (1) for measurement of said angular position of said rotor, said method comprises a step of measurement or estimation of said temperature (42) of said magnetic material, and a step comprising making said threshold TRIG_PP dependent on said temperature, so as to have a linear function with the form TRIG_PP=pT+$K_s$, where p is the gradient of the straight line ($C_3$) which represents said linear function, T is said temperature, and $K_s$ is a constant, such as to delimit two regions, including a first region for values situated above said straight line ($C_3$), characteristic of fault-free functioning of said sensors (10), and a second region for values situated below said straight line ($C_3$), characteristic of functioning faults of said sensors (10).

7. A device for implementation of a method for diagnosis of functioning faults in sensors implemented in a system for measurement of an angular position of a rotor of a polyphase rotary electrical machine comprising a stator, said sensors being fixed relative to said stator, and able to detect a magnetic field and provide first signals which are representative of said magnetic field, said method comprising the steps of:

generating, from linear combinations of said first signals (101-103), at least one pair of first (200) and second (201) sinusoidal signals, which are dephased by a predetermined value different from zero and from 180°, representing an angular position of said rotor;

determining a first parameter known as a speed state $E_{vt}$ of said rotor, which assumes two values $E_{vt}$>0 or $E_{vt}$>0;

calculating the following first and second equations:

$[(S_{pp}<\text{TRIG\_PP}) \text{ OR } (C_{pp}<\text{TRIG\_PP})]$;

$[(V_{ref}-\Delta<S<V_{ref}+\Delta) \text{ AND } [(V_{ref}-\Delta<C<V_{ref}+\Delta)]$, in which "OR" is the non-exclusive disjunction logic operator and "AND" is the conjunction logic operator, $S_{pp}$ is the maximum peak-to-peak amplitude and S is the instantaneous value of said first sinusoidal signal (200), $C_{pp}$ is the maximum peak-to-peak amplitude and C is the instantaneous value of said second sinusoidal signal (201), and TRIG_PP, $V_{ref}$ and $\Delta$ are three predetermined threshold values;

determining, when said speed state parameter $E_{vt}$ is greater than zero, the logic state "TRUE" or "FALSE" of said first equation, and generating a signal (400) which indicates fault-free functioning of said sensors when said first equation is not confirmed, and a functioning fault of at least one of these sensors when said first equation is confirmed; and determining, when said speed state parameter $E_{vt}$ is equal to or greater than zero, the logic state "TRUE" or "FALSE" of said second equation, and generating a signal (400) which indicates fault-free functioning of said sensors when said second equation is not confirmed, and a functioning fault of at least one of said sensors when said second equation is confirmed;

said device comprising:

means (41) for measurement of a speed of said rotor and generation of a signal representative of said speed state $E_{vt}$;

an electronic diagnostic module (40) which receives at least said first (200) and second (201) sinusoidal signals at first ($e_1$) and second ($e_2$) inputs, and said signal which represents said speed state $E_{vt}$ at a third input ($e_3$);

said diagnostic module (40) comprising means for development, on the basis of said signals and said predetermined thresholds, of said first and second equations, in order to confirm the "TRUE" or "FALSE" logic states of said equations, and to generate as output said signal (400) which is representative of fault-free functioning of said sensors (10), or of functioning faults of at least one of said sensors (10) according to said logic states.

8. The device according to claim 7, wherein said polyphase rotary electrical machine comprises a magnetic material which is sensitive to temperature variations in a predetermined functioning range of said system (1) for measurement of said angular position of said rotor, and also comprises means (42) for measurement or estimation of said temperature of said material which provide a signal (T) representative of said temperature which is transmitted to a fourth input ($e_4$) of said diagnostic module (40), and in that said diagnostic module (40) generates a threshold value TRIG_PP which conforms with a linear function with the form TRIG_PP=pT+$K_s$, where p is the gradient of the straight line which represents said linear function, T is said temperature, and $K_s$ is a constant.

9. The device according to claim 7, wherein, since said polyphase rotary electrical machine is a three-phase machine, said system (1) for measurement of said angular position of said rotor comprises three sensors (10) known as $S_1$ to $S_3$ respectively, wherein said system (1) additionally comprises means (100) for supply of electrical energy to said sensors (10) which provide a voltage $V_{cc}$ with a predetermined amplitude, and wherein, when said first equation is confirmed, said device generates as output (400) a diagnostic signal which indicates a type of fault included amongst the following categories: said sensor $S_1$ is short-circuited whilst being connected to a predetermined potential (0V or $V_{cc}$), said sensor $S_1$ is disconnected, said sensors $S_2$ or $S_3$ are short-circuited whilst being connected to a predetermined potential (0V or $V_{cc}$) or to one another, said sensors $S_1$ and ($S_2$ or $S_3$) are disconnected, said sensors $S_1$ and $S_2$ and $S_3$ are short-circuited whilst being connected to a predetermined potential (0V or $V_{cc}$) or to one another, said sensors $S_1$ and $S_2$ and $S_3$ are disconnected or said means (100) for supply of electrical energy are faulty.

10. The device according to claim 7, wherein, since said polyphase rotary electrical machine is a three-phase machine, said system for measurement of said angular position of said rotor comprises three sensors (10) known as $S_1$ to $S_3$ respectively, wherein said system (1) additionally comprises means (100) for supply of electrical energy to said sensors (10) which provide a voltage $V_{cc}$ with a predetermined amplitude, and wherein, when said second equation is confirmed, said device generates as output (400) a diagnostic signal which indicates a type of fault included amongst the following categories: said sensors $S_1$ and $S_2$ and $S_3$ are disconnected, said sensors $S_1$ and $S_2$ and $S_3$ are short-circuited whilst being connected to a predetermined potential (0V or $V_{cc}$), said sensors $S_1$ and $S_2$ and $S_3$ are short-circuited whilst being connected to a predetermined potential (0V or $V_{cc}$) or to one another, or said means (100) for supply of electrical energy are faulty.

11. The device according to claim 7, wherein said sensors (10) are constituted by Hall-effect sensors.

12. The device according to claim 7, wherein said polyphase rotary electrical machine is an alternator-starter.

13. The device according claim 7, wherein said diagnostic module (40) is constituted by an on-board digital computer with a pre-recorded program.

* * * * *